United States Patent
Linsky et al.

(10) Patent No.: US 10,652,718 B2
(45) Date of Patent: May 12, 2020

(54) AUDIO CORRELATION SELECTION SCHEME

(71) Applicant: QUALCOMM Incorporated, San Diego, CA (US)

(72) Inventors: Joel Benjamin Linsky, San Diego, CA (US); Brian Arnold Redding, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/461,464

(22) Filed: Mar. 16, 2017

(65) Prior Publication Data

US 2018/0270592 A1    Sep. 20, 2018

(51) Int. Cl.
*H04W 4/80* (2018.01)
*H04W 76/10* (2018.01)

(52) U.S. Cl.
CPC ............. *H04W 4/80* (2018.02); *H04W 76/10* (2018.02); *H04R 2227/003* (2013.01)

(58) Field of Classification Search
None
See application file for complete search history.

(56) References Cited

U.S. PATENT DOCUMENTS

| | | |
|---|---|---|
| 8,843,649 B2 | 9/2014 | Bailey |
| 9,082,413 B2 | 7/2015 | Herring et al. |
| 2004/0176046 A1 * | 9/2004 | Vicari .................. H04L 1/22 455/76 |
| 2005/0096899 A1 * | 5/2005 | Padhi ................ G10L 15/10 704/216 |
| 2008/0175399 A1 * | 7/2008 | Kim .................... H03G 3/32 381/57 |

(Continued)

FOREIGN PATENT DOCUMENTS

CN    203492199 U    3/2014

OTHER PUBLICATIONS

International Search Report and Written Opinion—PCT/US2018/015396—ISA/EPO—dated May 4, 2018.

*Primary Examiner* — Curtis A Kuntz
*Assistant Examiner* — Kenny H Truong
(74) *Attorney, Agent, or Firm* — Muncy, Geissler, Olds & Lowe, P.C./QUALCOMM (57) ABSTRACT

The disclosure generally relates to connecting wireless devices based on a correlation between different audio sources. For example, according to various aspects, a first wireless device may capture sound via a microphone and receive audio content from a second wireless device via a wireless receiver. Accordingly, a wireless connection may be established between the first and second wireless devices based on a substantial match between the sound captured via the microphone and the audio content received via the wireless receiver. For example, the sound captured via the microphone may be output from a speaker on the second wireless device. In other examples, the received audio content may be sound captured via a local microphone at the second wireless device. In either case, the correlation between the audio received through the microphone and the audio content received over a radio may substantially simplify the procedure(s) used to connect two audio-enabled devices.

32 Claims, 6 Drawing Sheets

(56) References Cited

U.S. PATENT DOCUMENTS

| | | | |
|---|---|---|---|
| 2012/0321112 A1* | 12/2012 | Schubert | H04R 25/43 381/312 |
| 2014/0046664 A1 | 2/2014 | Sarkar et al. | |
| 2014/0256260 A1 | 9/2014 | Ueda et al. | |
| 2015/0049892 A1 | 2/2015 | Petersen et al. | |
| 2015/0223011 A1 | 8/2015 | Yato et al. | |
| 2016/0134979 A1* | 5/2016 | El-Hoiydi | H04B 1/715 381/315 |
| 2017/0070820 A1* | 3/2017 | Behringer | H04S 7/308 |

* cited by examiner

AUDIO CORRELATION SELECTION SCHEME

TECHNICAL FIELD

The various aspects and embodiments described herein generally relate to connecting wireless devices based on a correlation between different audio sources.

BACKGROUND

Many devices that consumers want to connect are audio related. For example, common use cases may comprise a headset to phone connection, a phone to stereo speaker connection, a phone to vehicle infotainment connection, a headset to television connection, among many others. In general, wireless device may use Bluetooth (Classic or Low-Energy), Wi-Fi, and/or other suitable wireless technologies to exchange audio data. In many cases, Bluetooth tends to be the preferred connectivity mechanism used on portable wireless audio devices. However, connecting wireless devices is one of the most frequent user experience problems that consumers tend to face. Current usage models to connect devices usually involve navigating menus, pressing buttons, or otherwise interfacing with one or more devices to be connected via a user interface. Although these usage models may literally work to support current use cases, the usage models do not scale well to support always-on devices, nor do such usage models work well for the elderly or impaired individuals. Moreover, these usage models tend to be cumbersome and inefficient. Traditionally, the wireless audio market has approached use cases in which the audio stream is either over a wire to a speaker or wireless to a speaker. The hearing aid industry in particular has recognized that there are many use cases in which the audio stream will be communicated to normal (wired) speakers and simultaneously broadcast over wireless radios. The challenge in the hearing aid industry (and other wireless audio markets) is to detect and find such wireless broadcasts without user interaction and without compromising battery life on the receiving device.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a method for connecting wireless devices may comprise, at a first wireless device, capturing sound via a microphone, receiving audio content from a second wireless device via a wireless receiver, and establishing a wireless connection with the second wireless device based on a substantial match between the sound captured via the microphone and the audio content received via the wireless receiver. For example, according to various aspects, the sound captured via the microphone at the first wireless device may comprise audio that is output from a speaker at the second wireless device. In other examples, the audio content received via the wireless receiver may comprise sound that was captured at the second wireless device via a local microphone, whereby the substantial match between the sound captured via the microphone and the audio content received via the wireless receiver may indicate that the first and wireless devices are in the same proximate environment.

According to various aspects, an apparatus may comprise a microphone configured to capture proximate sound, a wireless receiver configured to receive audio content from a wireless device, and at least one processor configured to establish a wireless connection with the wireless device based on a substantial match between the proximate sound captured via the microphone and the audio content received via the wireless receiver. For example, according to various aspects, the proximate sound captured via the microphone may comprise audio that is output from a speaker at the wireless device. In other examples, the audio content received via the wireless receiver may comprise sound that was captured at the wireless device via a local microphone, whereby the substantial match between the sound captured via the microphone and the audio content received via the wireless receiver may indicate that the apparatus and the wireless device are in the same proximate environment.

According to various aspects, an apparatus may comprise means for capturing proximate sound, means for receiving audio content from a wireless device, and means for establishing a wireless connection with the wireless device based on a substantial match between the captured proximate sound and the received audio content.

According to various aspects, a computer-readable medium may store computer-executable instructions configured to cause a first wireless device to capture sound via a microphone, receive audio content from a second wireless device via a wireless receiver, and establish a wireless connection with the second wireless device based on a substantial match between the sound captured via the microphone and the audio content received via the wireless receiver.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

The various aspects and embodiments described herein generally relate to methods, devices, systems, etc. to enable point-to-point and/or point-to-multipoint wireless communication among devices that have been "paired" or "bonded" to one another. In particular, pairing generally refers to a process through which devices register with each other, often under user control. Once paired, the devices typically can communicate with each other whenever the devices are active and within suitable range without re-performing the pairing process. Before pairing, however, the devices must first discover each other, for example, through entering a discoverable state in which devices can exchange discovery messages used to discover each other. Upon discovery, the devices may pair with each other. Pairing is at least partly a security function to limit pairing to particular devices. For example, pairing may include a message exchange based on password authentication schemes in which a first device must respond with a password (such as a four digit number, which is often fixed at the factory) to a second device to prevent unauthorized or undesired pairing. In networking protocols such as Bluetooth, discovery and pairing are separate procedures. However, discovery and pairing are most often performed together. For some wireless devices, such complexity (e.g., password entry) merely makes device pairing difficult and cumbersome.

Accordingly, as will be described in further detail herein, the various aspects and embodiments described herein may assist device discovery mechanisms through correlating audio received via at least two different sources, such as sound received via a microphone and an audio data stream received via a wireless radio. Accordingly, based on a substantial correlation between the audio received from at least two different sources, two wireless devices may automatically discover one another, establish a connection, and then communicate with each other directly using wireless local area network (WLAN) and/or wireless personal area network (WPAN) radio technology, such as a technology based on the IEEE 802.11 family of standards (Wi-Fi), Bluetooth, the IEEE 802.15 family of standards (ZigBee), and the like.

Figure 1:
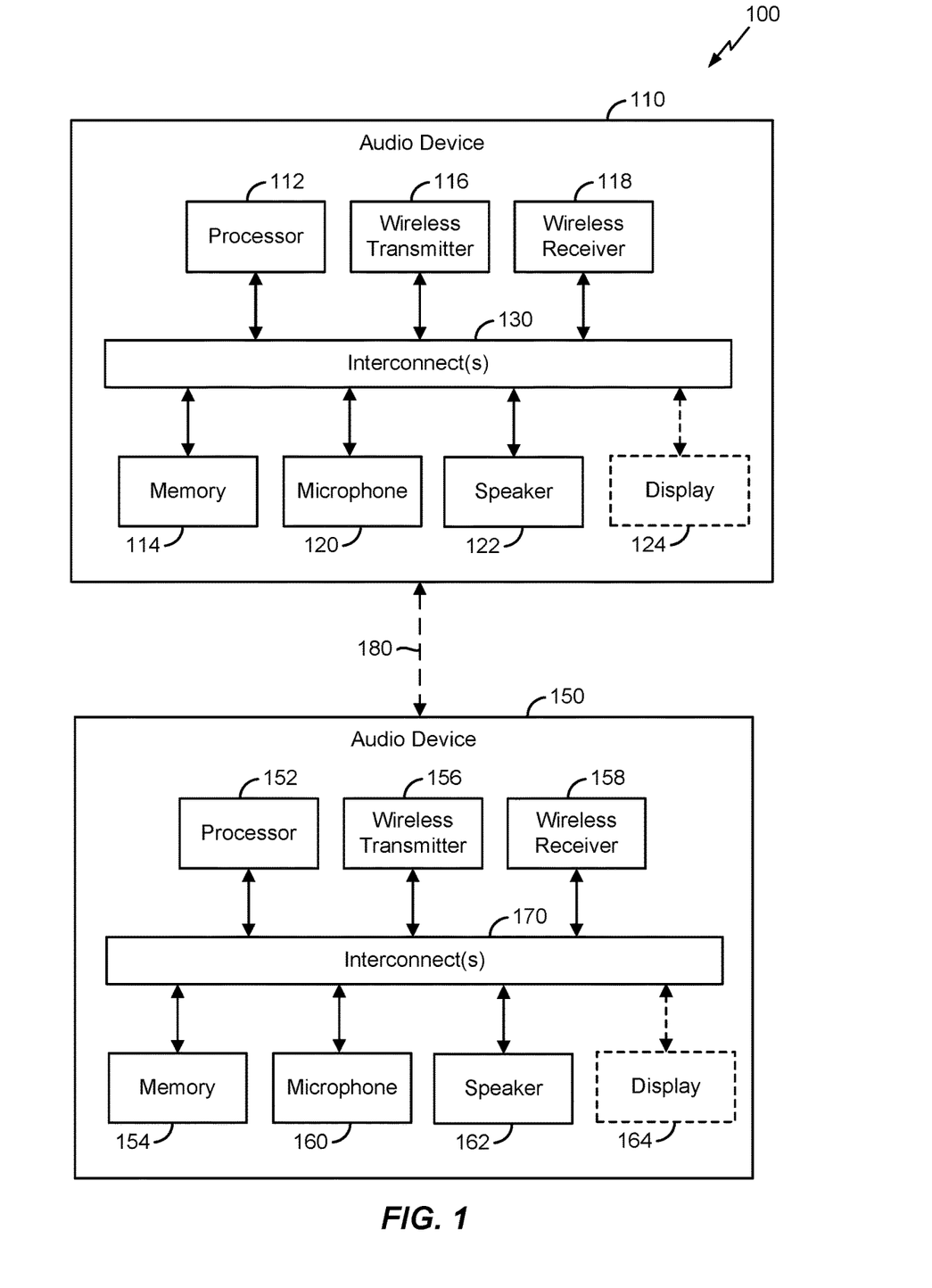
FIG. 1 illustrates an exemplary wireless communication system in which wireless devices may connect to one another based on a correlation between different audio sources, according to various aspects.

More particularly, according to various aspects, FIG. 1 illustrates an exemplary wireless communication system 100 in which wireless devices may connect to one another based on a correlation between different audio sources. As will be described in further detail below, the device discovery mechanisms described herein may generally assume that many wireless audio devices will include some or all of a wireless transmitter, a wireless receiver, a microphone, and a speaker. For example, as shown in FIG. 1, the wireless communication system 100 may include a first audio device 110 that has a wireless transmitter 116, a wireless receiver 118, a microphone 120, a speaker 122, and a processor 112 and memory 114 that may be coupled to and configured to control the other components via one or more interconnects 130 (e.g., one or more buses, lines, fibers, links, etc.). In a similar respect, the second audio device 150 may have a wireless transmitter 156, a wireless receiver 158, a microphone 160, a speaker 162, and a processor 152 and memory 154 that may be coupled to and configured to control the other components via one or more interconnects 170.

According to various aspects, the first audio device 110 and the second audio device 150 may be any suitable audio-related devices that can be connected to one another via a wireless link 180. In general, the audio devices 110, 150 may be wireless headsets, wireless phones, stereo speakers, vehicle infotainment systems, smart televisions, hearing aids, public announcement systems, or the like. The audio devices 110, 150 may automatically establish a wireless connection (e.g., to receive a wireless audio stream, to receive audio messages, to allow access to data or information on the other device, etc.) based on a substantial correlation between audio received through a microphone and audio content received over a wireless receiver.

For example, in various embodiments, the first audio device 110 may be an audio source and the second audio device 150 is an audio sink. In an exemplary use case, as will be described in further detail below with reference to FIG. 2 and FIG. 3, the first audio device 110 may output the audio content via the local speaker 122 and further broadcast or otherwise transmit the audio content via the wireless link 180 using the wireless transmitter 116. The second audio device 150 may listen to sound in a proximate environment using the microphone 160 and automatically synchronize to the wireless link 180 via the wireless receiver 158 (e.g., without user intervention) in response to detecting a substantial correlation between the audio content transmitted via the wireless link 180 and the sound heard over the microphone 160. Furthermore, in various embodiments, the first audio device 110 and/or the second audio device 150 may optionally include a local display 124, 164, which may be used to display data that may be relevant to the audio content transmitted via the wireless link 180. For example, when the first audio device 110 transmits the audio content via the wireless link 180 using the wireless transmitter 116, the first audio device 110 may also transmit a corresponding audio transcript such that transcribed text corresponding to the audio content can be suitably rendered at the second audio device 150 via the display 164. Furthermore, although the foregoing description has been provided with reference to embodiments in which the first audio device 110 transmits the audio content via the wireless link 180, those skilled in the art will appreciate that the example use case as described may be suitably implemented in the reverse, with the second audio device 150 playing sound via the speaker 162 and further transmitting the audio content via the wireless link 180 using the wireless transmitter 156 associated therewith.

In another exemplary embodiment, as will be described in further detail below with reference to FIG. 4 and FIG. 5, the first audio device 110 may listen to sound in the proximate environment using the microphone 120 and further broadcast or otherwise transmit the sound captured via the microphone over the wireless link 180 using the wireless transmitter 116. The second audio device 150 may likewise listen to sound in the proximate environment using the microphone 160 and receive the audio transmitted from the first audio device 110 via the wireless link 180. Accordingly, the second audio device 150 may allow a connection to occur, grant access, or otherwise establish a wireless connection with the first audio device 110 in response to detecting a substantial correlation between the audio content transmitted via the wireless link 180 and the sound heard over the microphone 160. In this case, the correlation between the audio transmitted via the wireless link 180 and the sound heard over the microphone 160 may indicate that the audio devices 110, 150 are in the same proximate environment based on the similarity between the sound captured at the respective microphones 120, 160. Furthermore, although the foregoing description has been provided with reference to embodiments in which the first audio device 110 transmits the sound captured from the proximate environment, those skilled in the art will appreciate that the example use case as described may be suitably implemented in the reverse, with the second audio device 150 doing the transmitting and the first audio device 110 doing the receiving.

Figure 2:
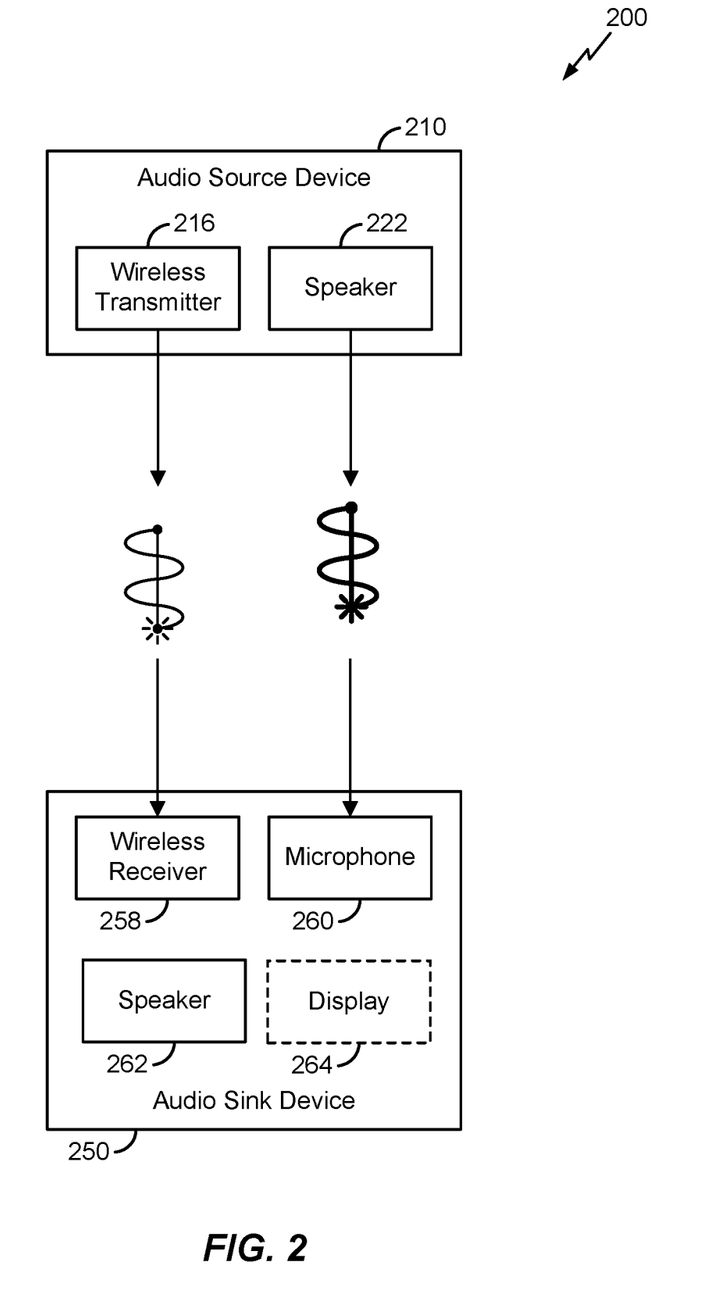
FIG. 2 illustrates an exemplary wireless communication system in which an audio sink device may automatically synchronize to a wireless audio stream from an audio source device, according to various aspects.

According to various aspects, FIG. 2 illustrates an exemplary wireless communication system 200 in which an audio sink device 250 may automatically synchronize to a wireless audio stream from an audio source device 210. For example, in various embodiments, the mechanisms employed in the wireless communication system 200 may be used to connect a wireless phone to a wireless headset, a stereo speaker, a vehicle infotainment system, etc., to connect a television to a wireless headset, a wireless hearing aid, etc., or to connect any other suitable audio-enabled wireless devices. In general, the mechanisms used to connect the audio source device 210 to the audio sink device 250 will be described herein with reference to certain components that serve a principal role in the connection mechanism(s). As such, those skilled in the art will appreciate that the particular configurations illustrated in FIG. 2 are generally considered to be minimal configurations needed to implement the connection mechanisms described herein and that the audio source device 210 and/or the audio sink device 250 may include additional components not specifically shown in FIG. 2.

According to various aspects, at a high-level, the mechanisms used to connect the audio source device 210 with the audio sink device 250 may involve a correlation between audio received at the audio sink device 250 via a microphone 260 with audio content received via a wireless receiver (or radio) 258. For example, according to various aspects, the audio source device 210 may play sound via a local speaker 222 and use a wireless transmitter 216 to broadcast or otherwise transmit the same audio content over a wireless link (or wireless channel) within a suitable range of delay from the sound played via the speaker 222. The audio sink device 250 may therefore synchronize on the wireless link based on a correlation between the audio content received via the wireless receiver 258 and the sound heard via the microphone 260 such that the audio content received via the wireless receiver 258 may be rendered or otherwise output via a local speaker 262. Furthermore, in various embodiments, the audio source device 210 may be configured to render an audio chirp or other suitable audible sound via the speaker 222 to indicate that a wireless broadcast or wireless transmission exists. In the latter case, adding the audio chirp or indicator sound to the audio played via the speaker 222 may indicate that the wireless audio stream is present to the audio sink device 250, which may save power that the wireless receiver 258 may otherwise consume when searching for wireless audio streams, save in complexity on the audio processing, etc.

In various embodiments, the audio sink device 250 may thus periodically search for wireless audio streams via the wireless receiver 258 and/or initiate the search based on detecting the audio chirp or other suitable indicator sound via the microphone 260. In response to detecting the wireless audio stream via the wireless receiver 258, the audio sink device 250 may compare the audio on the wireless audio stream to the audio captured via the microphone 260. In response to a determination that the audio content is sufficiently similar and within an expected range of delay, the audio sink device 250 may automatically select the wireless link or wireless channel containing the wireless audio stream. Accordingly, the audio sink device 250 may use the speaker 262 to render or otherwise output the audio content received via the wireless receiver 258. Furthermore, according to various aspects, the audio source device 210 may be configured to repeat the audio content transmitted via the wireless transmitter 216 one or more times in case the audio sink device 250 cannot synchronize to the wireless audio stream quickly enough to hear the beginning of the audio stream. In another potential variant, the audio source device 210 may be configured to include an audio transcript corresponding to the audio content transmitted via the wireless transmitter 216 within the wireless audio stream such that the transcript can be viewed at the audio sink device 250 using an optional display 264.

Figure 3:
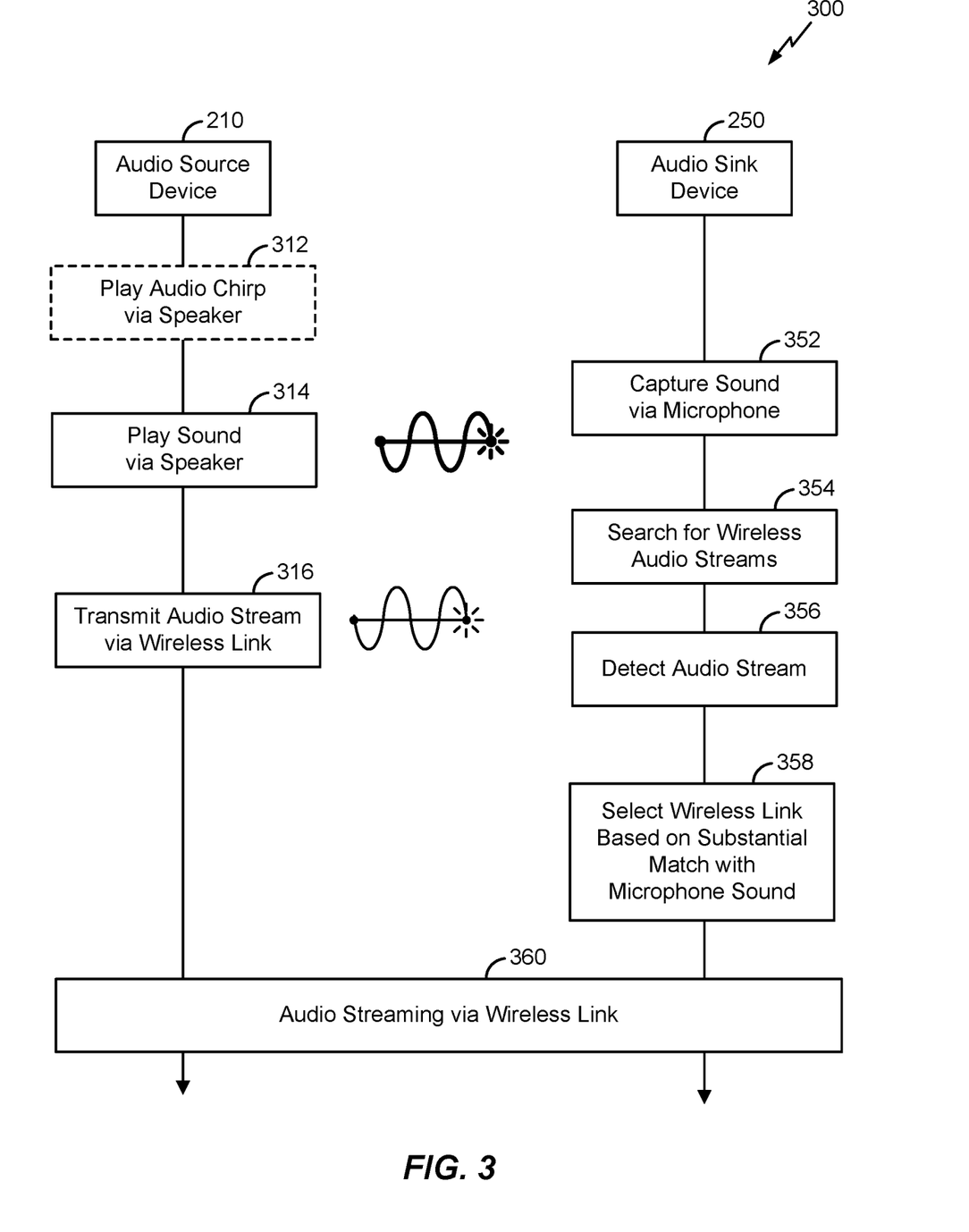
FIG. 3 illustrates an exemplary communication flow that can be employed in the wireless communication system shown in FIG. 2, according to various aspects.

According to various aspects, FIG. 3 illustrates an exemplary communication flow 300 that can be employed in the wireless communication system shown in FIG. 2. For example, at 312, the audio source device 210 may optionally play or otherwise render an audio chirp or other suitable audible sound via the speaker at to indicate that a wireless broadcast or wireless transmission exists. The audio source device 210 may further play an audio stream via a local speaker at 314 and use a wireless transmitter to broadcast or otherwise transmit the same audio content over a wireless link (or wireless channel) within a suitable range of delay at 316. Accordingly, the audio sink device 250 may be listening to sounds in a proximate environment at 352 and periodically search for wireless audio streams at 354. Alternatively, in use cases where the audio source device 210 plays the audio chirp to indicate that the wireless audio stream is present, the audio sink device 250 may initiate the search at 354 based on detecting the audio chirp or other suitable indicator sound via the microphone. In response to detecting the wireless audio stream via a wireless receiver, at 356, the audio sink device 250 may compare the audio on the wireless audio stream to the audio captured via the microphone. In response to a determination that the audio content is sufficiently similar and within an expected range of delay, the audio sink device 250 may automatically select the wireless link or wireless channel containing the wireless audio stream at 358. Accordingly, at 360, the audio sink device 250 may use a speaker to render or otherwise output the audio content broadcasted, streamed, or otherwise transmitted via the wireless link. Furthermore, according to various aspects, the audio source device 210 may be configured to repeat the audio content transmitted in the wireless audio stream at block 316 one or more times in case the audio sink device 250 cannot synchronize to the wireless audio stream quickly enough to hear the beginning of the audio stream. In another potential variant, the audio source device 210 may be configured to include an audio transcript corresponding to the audio content transmitted at block 316 such that the transcript can be viewed at the audio sink device 250.

As such, the mechanisms described above may enable audio-enabled wireless devices to automatically and easily connect when audio captured via a microphone correlates with audio received over a wireless link. The above-described connection mechanisms will now be explained with reference to specific example use cases.

For example, in one use case, the connection mechanisms described in further detail above may enable a hearing aid with wireless communication capabilities to automatically synchronize with a television with wireless communication capabilities. In this example use case, the hearing aid may correspond to the audio sink device 250 and the television may correspond to the audio source device 210. Accordingly, a user wearing the hearing aid may turn on the television, which may then play sound via the speaker 222 in the normal manner (or the television may initially play an audio chirp or other sound signal to indicate that a wireless audio transmission exists). The television may further broadcast or otherwise transmit the same audio content via the wireless transmitter 216. The microphone 260 at the hearing aid may capture the sound that the television plays via the speaker 222 and the wireless receiver 258 at the hearing aid may receive the audio content transmitted via the wireless transmitter 216. In response to determining that a substantial correlation exists between the sound captured via the microphone 260 and the audio content received via the wireless receiver 258, the hearing aid may automatically synchronize with the audio content transmitted between the wireless transmitter 216 and the wireless receiver 258. Accordingly, the user wearing the hearing aid can hear the audio playing on the television via the local speaker 262 without having to turn up the volume on the television, without having to change any settings on the hearing aid, etc.

In another example use case, the connection mechanisms described in further detail above may enable a hearing aid to automatically synchronize with a public announcement system (e.g., in an airport or other environment where audio messages may be broadcasted). In this example use case, the hearing aid may again correspond to the audio sink device 250 and the public announcement system may correspond to the audio source device 210. Accordingly, a user wearing the hearing aid may be located in the environment where public announcements are made. For example, the user may be traveling and located in an area within an airport close to a departure gate. An audio announcement may be played over the speaker 222 (e.g., an intercom) announcing that the user's departure gate has changed. The announcement may also be broadcasted or otherwise transmitted via the wireless transmitter 216. The microphone 260 at the hearing aid may therefore capture the announcement played via the intercom and the wireless receiver 258 may receive the corresponding audio announcement transmitted via the wireless transmitter 216. In response to determining that a substantial correlation exists between the sound captured via the microphone 260 and the audio announcement received via the wireless receiver 258, the hearing aid may automatically synchronize with the audio announcement channel over the public announcement system and play the announcement back to the user who can thereby hear the announcement clearly via the local speaker 262. Furthermore, as in other use cases, an audio chirp may be played via the intercom/speaker 222 to provide a signal that a corresponding wireless transmission exists. In addition, the announcement or message communicated over the wireless channel may be repeated one or more times in case the receiving hearing aid cannot synchronize to the wireless channel quickly enough to hear the entire announcement. Further still, the public announcement system may transmit an audio transcript, text, and/or other suitable data via the wireless transmitter 216 such that the announcement/message can be shown on the display 264 at the audio sink device 250.

In still another example use case, the connection mechanisms described above may be used to pair or bond a wireless headset with a mobile phone. In this example use case, the wireless headset may correspond to the audio source device 210 and the mobile phone may correspond to the audio sink device 250. However, when used in a pairing context, the roles may be suitably reversed assuming that both devices have a speaker, a microphone, and wireless transmission and receiving capabilities. In general, the pairing procedure may involve a user powering on the wireless headset while the mobile phone is located in the vicinity. For some period of time after being powered on, the headset may play an audio stream via the speaker 222 and transmit the same audio content via the wireless transmitter 216. In addition, the headset may optionally play an audio chirp via the speaker 222 at periodic intervals to indicate that the pairing audio stream is being transmitted via the wireless transmitter 216. The mobile phone may be listening via the microphone 260 in a substantially continuous manner. The mobile phone may further search for wireless audio streams via the wireless receiver 258 in response to detecting a pairing audio stream via the microphone 260, in response to detecting the audio chirp indicating that the pairing audio stream is present, or the phone may simply search for the wireless audio streams at periodic intervals. In any case, the mobile phone may determine whether a substantial correlation exists between the sound captured via the microphone 260 and the audio content received via the wireless receiver 258. For example, there may be some expected delay between the sound captured via the microphone 260 and the audio received via the wireless receiver 258. As such, the mobile phone may determine whether the sound captured via the microphone 260 is sufficiently similar to the audio received via the wireless receiver 258 and whether the delay between the two is within the expected range. In the affirmative, the mobile phone may prompt the user to pair the headset and do so in response to the user making such a request (e.g., to start an audio stream from the phone to the headset or engage in any other function between paired devices). Otherwise, the mobile phone may ignore the wireless audio stream if the sound captured via the microphone 260 is dissimilar from the audio received via the wireless receiver 258 and/or a delay between the two does not fall within the expected range of delay.

Figure 4:
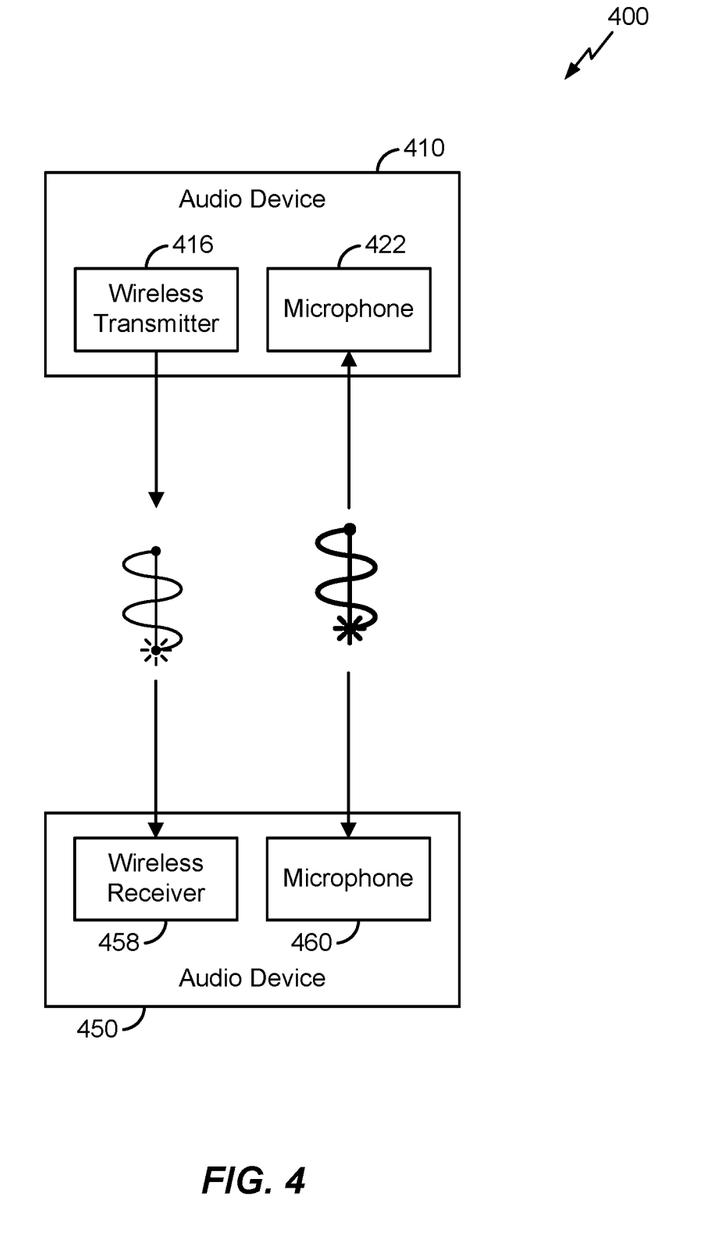
FIG. 4 illustrates an exemplary wireless communication system in which audio-enabled wireless devices may automatically establish a wireless connection based on a correlation between different audio sources, according to various aspects.

According to various aspects, FIG. 4 illustrates an exemplary wireless communication system 400 in which a first audio device 410 and a second audio device 450 may automatically establish a wireless connection based on a correlation between different audio sources. In general, the mechanisms used to connect the audio devices 210, 250 will be described herein with reference to certain components that serve a principal role in the connection mechanism(s). As such, those skilled in the art will appreciate that the particular configurations illustrated in FIG. 4 are generally considered to be minimal configurations needed to implement the connection mechanisms described herein and that the audio devices 410, 450 may suitably include additional components not specifically shown in FIG. 4.

According to various aspects, at a high-level, the mechanisms used to connect the audio devices 410, 450 may involve a correlation between audio received one audio device via a microphone 460 with audio content received at such audio device via a wireless receiver (or radio) 458. The system 400 shown in FIG. 4 will be explained with reference to an example implementation in which the audio devices 410, 450 automatically connect based on a correlation between audio that the audio device 450 captures via the microphone 460 and audio that the audio device 450 receives via the wireless receiver 458. For example, according to various aspects, the audio device 410 may capture proximate sounds via a microphone 422 and use the wireless transmitter 416 to broadcast or otherwise transmit the sounds captured via the microphone 422. The other audio device 450 may similarly capture proximate sounds via the microphone 460 and receive the audio content transmitted from the other audio device 410 via the wireless receiver 458. The audio device 450 may therefore connect to the other audio device 410 based on a substantial correlation between the proximate sounds heard via the microphone 460 and the audio received via the wireless receiver 458. In particular, where the proximate sounds heard via the microphone 460 and the audio received via the wireless receiver 458 are sufficiently similar and a delay between the two is within an expected range, an inference can be made that the audio devices 410, 450 are within the same proximate environment. On the other hand, where the proximate sounds heard via the microphone 460 is dissimilar from the audio received via the wireless receiver 458 and/or the delay between the two is outside the expected range, the audio devices 410, 450 the proximate environment around the audio devices 410, 450 may be distinct such that a connection is not permitted (e.g., where the audio devices 410, 450 are in different vehicles that are also within sufficient distance that allow wireless signals to travel from one vehicle to the other).

Figure 5:
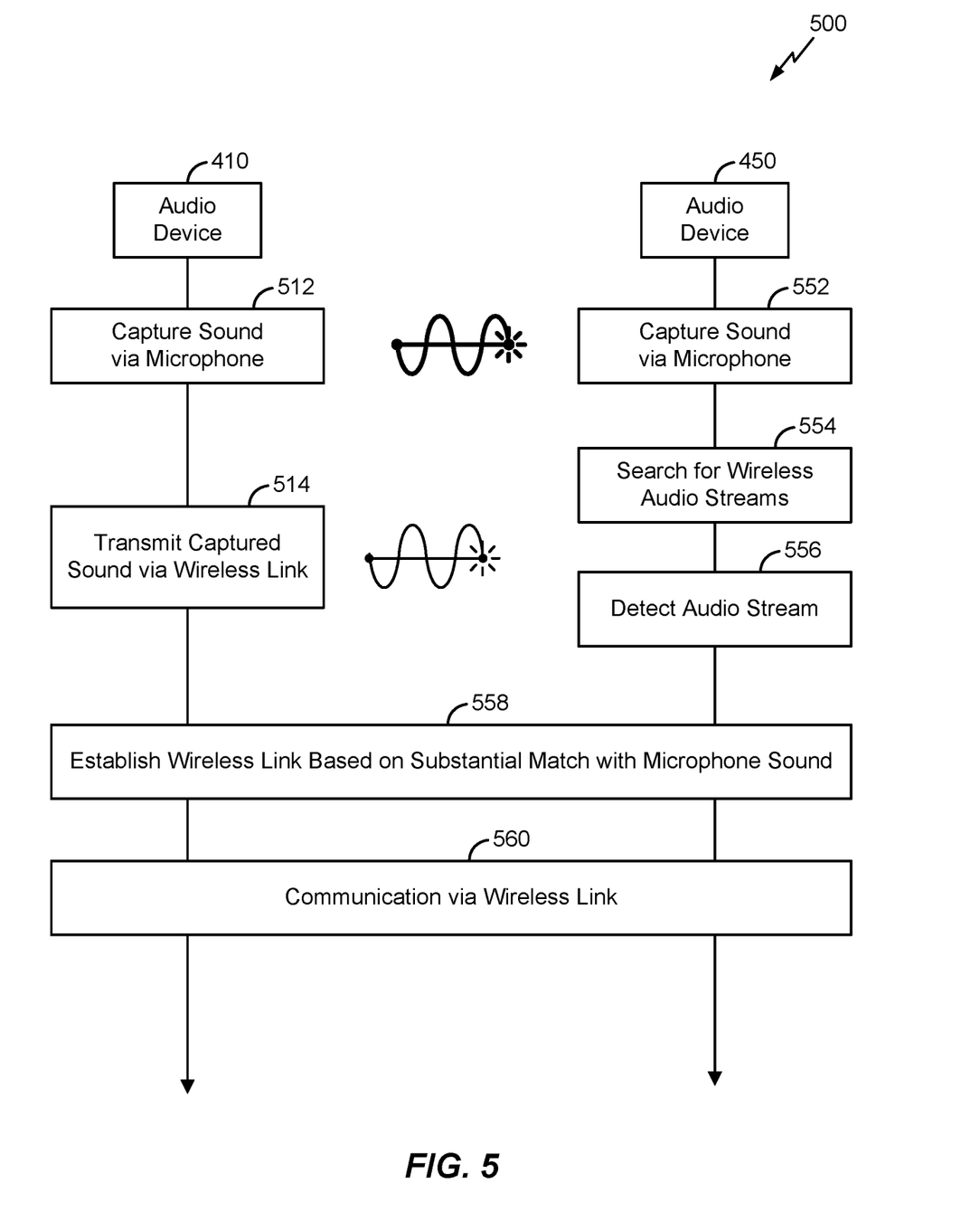
FIG. 5 illustrates an exemplary communication flow that can be employed in the wireless communication system shown in FIG. 4, according to various aspects.

According to various aspects, FIG. 5 illustrates an exemplary communication flow 500 that can be employed in the wireless communication system shown in FIG. 4. For example, the audio devices 410, 450 may each capture sound via the local microphones associated therewith at 512, 552. The audio device initiating the connection request, audio device 410 in the illustrated example, may then transmit the captured sound via a wireless channel at 514. The other device, audio device 450 in the illustrated example, may periodically search for wireless audio streams at 554, which may result in the audio device 450 detecting the audio stream from the other audio device 410 at block 556. Accordingly, based on a substantial match between the sound captured via the microphone at block 552 and the audio content received in the audio stream that was detected at block 556, the audio devices 410, 450 may establish a wireless link or other suitable connection. For example, in various embodiments, the audio device 450 receiving the audio stream from the other audio device 410 may be configured to detect a substantial match between the wireless audio stream and the audio captured via the microphone where the two are sufficiently similar and within the expected range of delay. The audio devices 410, 450 may then communicate with one another via the established wireless link at 560. For example, the communication at block 560 may be to stream audio, perform a file transfer, grant access, etc. Furthermore, as noted above, the wireless link may be established at 558 where there is a substantial match between the wireless audio stream and the audio captured via the microphone. As such, in cases where the wireless audio stream is dissimilar from the audio captured via the microphone and/or there is a delay outside the expected range, the operations performed at blocks 558, 560 may not be performed due to an inference that the audio devices 410, 450 are not located in the same proximate environment.

As such, the mechanisms described above may enable audio-enabled wireless devices to automatically and easily connect when two audio-enabled wireless devices capture substantially the same proximate sounds via local microphones, which may be confirmed through having one audio-enabled device transmit the captured sound to the other over a wireless link and having the receiving device compare the sound transmitted over the wireless link to the sound captured at the local microphone. For example, in one example use case, the transmitting audio device 410 may be a mobile phone and the receiving audio device 450 may be a vehicle infotainment system. A user may wish to play a song on the mobile phone through the speakers coupled to the vehicle infotainment system. Accordingly, the user may press the play button on the mobile phone, which may ask the user whether he/she wishes to play the song on the vehicle infotainment system. The user may respond in the affirmative and the mobile phone may transmit a wireless audio stream containing the song content to the vehicle infotainment system. The connection process may therefore be substantially transparent to the user, as the mobile phone and the vehicle infotainment systems may have already authorized a wireless connection therebetween based on a determination that each device captured the same proximate sound via local microphones. Either the mobile phone or the vehicle infotainment system would have transmitted the proximate sound captured via the local microphone to the other device, which would have confirmed that the two devices are located in the same proximate environment based on a substantial match with the proximate sound that the receiving device captured via the local microphone. Although the foregoing description has been provided with reference to one specific use case, those skilled in the art will appreciate that many other use cases may suitably implement the above-described connection mechanisms.

Figure 6:
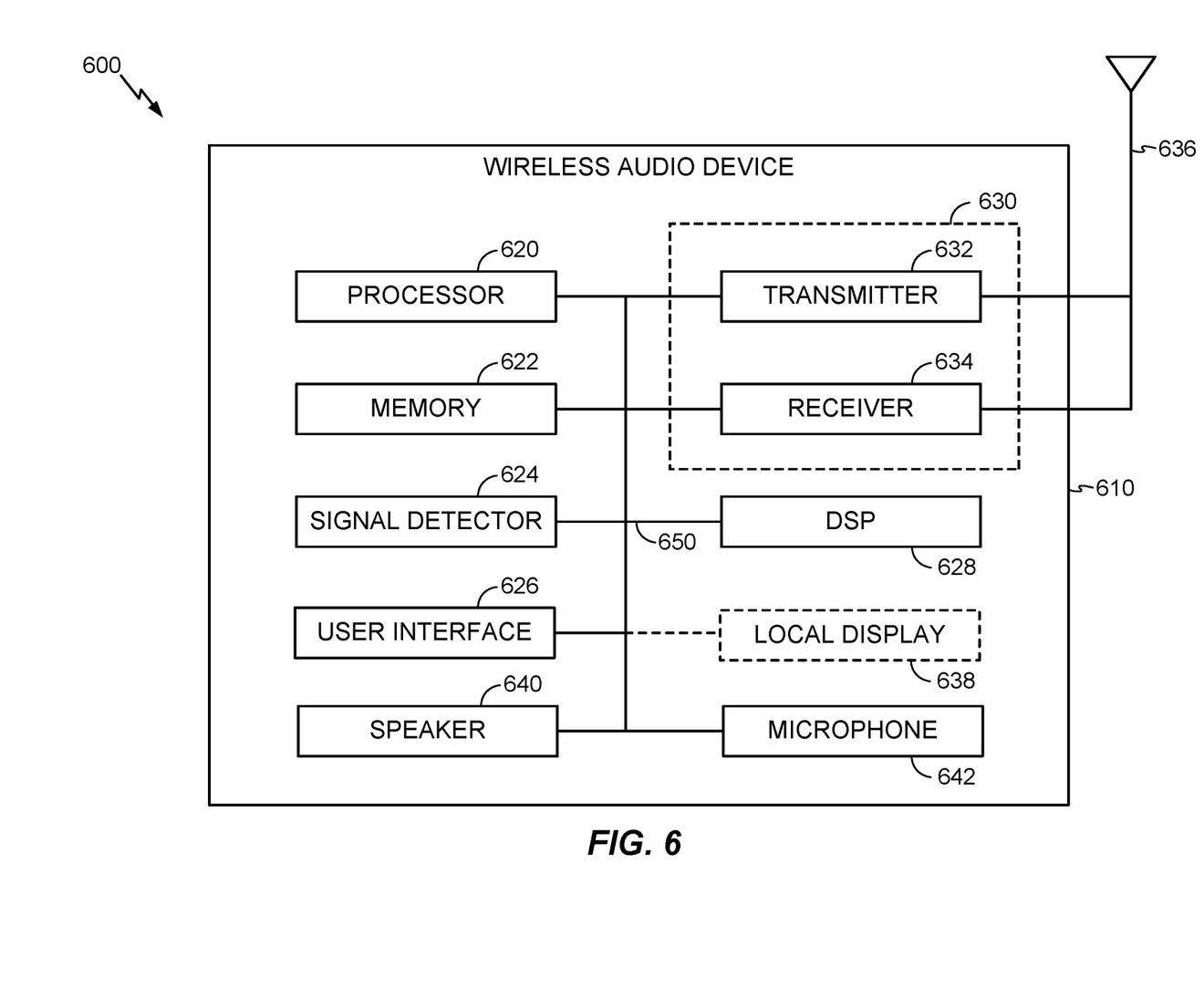
FIG. 6 illustrates an exemplary wireless device in which the various aspects and embodiments described herein can be suitably implemented.

According to various aspects, FIG. 6 illustrates an exemplary wireless audio device 600 that can implement the various aspects and embodiments described herein. For example, in various embodiments, the wireless audio device 600 may correspond to a source device that may broadcast the same audio content through a speaker 640 and over a wireless link and/or a sink device that may synchronize on the wireless link based on a correlation between sound heard via a microphone 642 and audio content received over a wireless link. In another example use case, the wireless audio device 600 may correspond to a device that can listen to proximate sounds using the microphone 642 and transmit the proximate sounds captured via the microphone 642 over a wireless link and/or to a device that may grant access, allow a connection, etc. in response to determining that audio content transmitted from another device via a wireless link substantially corresponds to proximate sounds captured via the microphone 642.

According to various embodiments, the wireless audio device 600 may include a housing 610, a processor 620, a memory 622, a transmitter 632, a receiver 634, an antenna 636, a signal detector 624, a digital signal processor (DSP) 628, a user interface 626, and a bus 650. Alternatively, the functions associated with the transmitter 632 and the receiver 634 can be incorporated into a transceiver 630. The wireless audio device 600 can be configured to communicate in a wireless network that includes, for example, a base station, an access point, etc.

According to various embodiments, the processor 620 can be configured to control operations associated with the wireless audio device 600, wherein the processor 620 may also be referred to as a central processing unit (CPU). The memory 622 can be coupled to the processor 620, can be in communication with the processor 620, and can provide instructions and data to the processor 620. The processor 620 can perform logical and arithmetic operations based on program instructions stored within the memory 622. The instructions in the memory 622 can be executable to perform one or more methods and processes described herein. Furthermore, in various embodiments, the processor 620 can include, or be a component in, a processing system implemented with one or more processors. The one or more processors can be implemented with any one or more general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, combinations thereof, and/or any other suitable entities that can perform calculations and/or manipulate information. In various embodiments, the processing system can also include machine-readable media configured to store software, which can be broadly construed to include any suitable instructions, whether referred to as software, firmware, middleware, microcode, hardware description language, or otherwise. Instructions can include code in a source code format, a binary code format, an executable code format, and/or any other suitable format. The instructions, when executed on the one or more processors, can cause the processing system to perform one or more of the functions described herein.

According to various embodiments, the memory 622 can include read-only memory (ROM), random access memory (RAM), and/or any suitable combination thereof. The memory 622 can also include non-volatile random access memory (NVRAM).

According to various embodiments, the transmitter 632 and the receiver 634 (or the transceiver 630) can transmit and receive data between the wireless audio device 600 and a remote location. The antenna 636 can be attached to the housing 610 and electrically coupled to the transceiver 630. In some implementations, the wireless audio device 600 can also include multiple transmitters, multiple receivers, multiple transceivers, and/or multiple antennas (not illustrated). In various embodiments, the signal detector 624 can be used to detect and quantify the level associated with one or more signals received at the transceiver 630. The signal detector 624 can detect such signals as total energy, energy per subcarrier per symbol, power spectral density, and/or and in other ways. In various embodiments, the DSP 628 can be used to process signals, wherein the DSP 628 can be configured to generate a packet to be transmitted via the transmitter 632 and/or the transceiver 630. In various embodiments, the packet can include a physical layer protocol data unit (PPDU).

According to various embodiments, the user interface 626 can include, for example, a keypad and/or any other suitable interface(s) that include one or more elements or components that can convey information to a user associated with the wireless audio device 600 and/or receive input from the user.

According to various embodiments, the wireless audio device 600 may optionally further include a local display 638, which may comprise any suitable video output devices such as a cathode ray tube (CRT), a liquid crystal display (LCD), a plasma display, a light emitting diode (LED) display, an organic light emitting diode (OLED) display, or another display device. In these or other examples, the local display 638 may be an emissive display or a transmissive display. The local display 638 may also be a touch-screen display or a presence-sensitive display such that the local display 638 is simultaneously an input device and an output (display) device. In various embodiments, such a touch-screen display may be capacitive, resistive, and/or another suitable touch or presence-sensitive panel that allows a user to provide user input.

In various embodiments, the various components associated with the wireless audio device 600 can be coupled together via the bus 650, which may include a data bus and a power bus, a control signal bus, and/or a status signal bus in addition to the data bus. In various embodiments, the wireless audio device 600 can also include other components or elements not illustrated in FIG. 6. One or more components associated with the wireless audio device 600 can be in communication with another one or more components associated with the wireless audio device 600 via means that may comprise another communication channel (not illustrated) to provide, for example, an input signal to the other component.

In various embodiments, although various separate components are illustrated in FIG. 6, one or more components shown therein can be combined or commonly implemented. For example, the processor 620 and the memory 622 can be embodied on a single chip. The processor 620 can additionally, or in the alternative, contain memory, such as processor registers. Similarly, one or more functional blocks or portions thereof can be embodied on a single chip. Alternatively, the functionality associated with a particular block can be implemented on two or more chips. For example, the processor 620 can be used to implement not only the functionality described above with respect to the processor 620, but also to implement the functionality described above with respect to the signal detector 624 and/or the DSP 628.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for connecting wireless devices, comprising:
listening via a microphone at a first wireless device;
playing, via a speaker at a second wireless device, a sound including an indicator, the indicator including an audio chirp;
playing, via the speaker at the second wireless device, an audio stream including audio content;
searching, at the first wireless device, in response to capturing, via the microphone, the sound including the indicator, for a wireless audio stream containing the audio content transmitted by the second wireless device;
detecting, via a wireless receiver at the first wireless device, the wireless audio stream containing the audio content transmitted by the second wireless device;
determining a delay between the sound captured via the microphone and the audio content contained in the wireless audio stream;

detecting a substantial match based on a substantial similarity between the sound captured via the microphone and the audio content contained in the wireless audio stream in combination with the determined delay falling within an expected range; and establishing, at the first wireless device, a wireless connection with the second wireless device.

2. The method recited in claim 1, wherein establishing a wireless connection with the second wireless device includes pairing the first wireless device with the second wireless device.

3. The method recited in claim 1, wherein the audio content received via the wireless receiver comprises sound captured at the second wireless device via a local microphone at the second wireless device.

4. The method recited in claim 3, wherein the substantial match between the sound captured via the microphone and the audio content transmitted by the second wireless device indicates that the first wireless device and the second wireless device are in the same proximate environment.

5. The method recited in claim 1, further comprising searching for the wireless audio stream containing the audio content transmitted by the second wireless device at periodic intervals.

6. The method recited in claim 1, further comprising:
receiving the wireless audio stream containing the audio content transmitted by the second wireless device via the established wireless connection; and
playing the audio content contained in the received wireless audio stream via a local speaker.

7. The method recited in claim 6, wherein the audio content contained in the received wireless audio stream comprises at least one audio message that is repeated one or more times.

8. The method recited in claim 7, further comprising:
receiving, from the second wireless device, a transcript corresponding to the at least one audio message via the established wireless connection; and
displaying the received transcript on a local display.

9. An apparatus, comprising:
a microphone configured to capture proximate sound and an audio stream, the proximate sound including an indicator, the indicator including an audio chirp, the audio stream including audio content, and the proximate sound output via a speaker at a second wireless device;
a wireless receiver configured to detect a wireless audio stream containing the audio content transmitted by the second wireless device; and
at least one processor configured to:
initiate a search, in response to capturing, via the microphone, the proximate sound including the indicator, for the wireless audio stream containing the audio content transmitted by the second wireless device,
detect, via the wireless receiver, the wireless audio stream containing the audio content transmitted by the second wireless device,
determine a delay between the proximate sound captured via the microphone and the audio content contained in the wireless audio stream,
detect a substantial match based on a substantial similarity between the proximate sound captured via the microphone and the audio content contained in the wireless audio stream in combination with the determined delay falling within an expected range, and
establish a wireless connection with the second wireless device.

10. The apparatus recited in claim 9, wherein establishing a wireless connection with the second wireless device includes pairing the apparatus with the second wireless device.

11. The apparatus recited in claim 9, wherein the audio content received via the wireless receiver comprises sound captured at the wireless device via a local microphone at the wireless device.

12. The apparatus recited in claim 11, wherein the substantial match between the proximate sound captured via the microphone and the audio content transmitted by the wireless device indicates that the apparatus and the wireless device are in the same proximate environment.

13. The apparatus recited in claim 9, wherein the at least one processor is further configured to search for the wireless audio stream containing the audio content transmitted by the wireless device at periodic intervals.

14. The apparatus recited in claim 9, further comprising:
a local speaker configured to play the audio content contained in the wireless audio stream, wherein the wireless audio stream containing the audio content transmitted by the wireless device is received via the established wireless connection.

15. The apparatus recited in claim 14, wherein the audio content contained in the received wireless audio stream comprises at least one audio message that is repeated one or more times.

16. The apparatus recited in claim 15, further comprising:
a local display configured to display a transcript corresponding to the at least one audio message, wherein the wireless receiver is configured to receive the transcript via the established wireless connection.

17. An apparatus, comprising:
means for capturing proximate sound, the proximate sound including an indicator, the indicator including an audio chirp, and an audio stream including audio content, the proximate sound output via a speaker at a wireless device;
means for searching, in response to capturing the proximate sound including the indicator, for a wireless audio stream containing the audio content transmitted by the wireless device;
means for detecting the wireless audio stream containing the audio content transmitted by the wireless device;
means for determining a delay between the sound captured via the microphone and the audio content contained in the wireless audio stream;
means for detecting a substantial match based on a substantial similarity between the captured proximate sound and the audio content contained in the wireless audio stream in combination with the determined delay falling within an expected range; and
means for establishing a wireless connection with the wireless device.

18. The apparatus recited in claim 17, wherein establishing a wireless connection with the second wireless device includes pairing the apparatus with the wireless device.

19. The apparatus recited in claim 17, wherein the received audio content comprises sound captured at the wireless device via a local microphone.

20. The apparatus recited in claim 19, wherein the substantial match between the captured proximate sound and the audio content transmitted by the wireless device indicates that the apparatus and the wireless device are in the same proximate environment.

21. The apparatus recited in claim 17, further comprising means for searching for the wireless audio stream containing the audio content transmitted by the wireless device at periodic intervals.

22. The apparatus recited in claim 17, further comprising:
means for receiving the wireless audio stream containing the audio content transmitted by the wireless device via the established wireless connection; and
means for playing the audio content contained in the received wireless audio stream.

23. The apparatus recited in claim 22, wherein the audio content contained in the received wireless audio stream from the wireless device comprises at least one audio message that is repeated one or more times.

24. The apparatus recited in claim 23, further comprising:
means for receiving, from the wireless device, a transcript corresponding to the at least one audio message via the established wireless connection; and
means for displaying the received transcript.

25. A non-transitory computer-readable storage medium storing computer-executable instructions, the stored computer-executable instructions configured to cause a first wireless device to:
listen, via a microphone, in a proximate environment;
capture a sound via the microphone, the sound including an indicator, the indicator including an audio chirp, and an audio stream including audio content, the sound played, via a speaker at a second wireless device, in the proximate environment;
search, in response to capturing the sound including the indicator, for a wireless audio stream containing audio content transmitted by the second wireless device;
detect, via a wireless receiver, the wireless audio stream containing the audio content transmitted by the second wireless device;
determine a delay between the sound captured via the microphone and the audio content contained in the wireless audio stream;
detect a substantial match based on a substantial similarity between the sound captured via the microphone and the audio content contained in the wireless audio stream in combination with the determined delay falling within an expected range; and
establish a wireless connection with the second wireless device.

26. The non-transitory computer-readable storage medium recited in claim 25, wherein establishing a wireless connection with the second wireless device includes pairing the first wireless device with the second wireless device.

27. The non-transitory computer-readable storage medium recited in claim 25, wherein the audio content received via the wireless receiver comprises sound captured at the second wireless device via a local microphone at the second wireless device.

28. The non-transitory computer-readable storage medium recited in claim 27, wherein the substantial match between the sound captured via the microphone and the audio content transmitted by the second wireless device indicates that the first wireless device and the second wireless device are in the same proximate environment.

29. The non-transitory computer-readable storage medium recited in claim 25, the stored computer-executable instructions further configured to cause the first wireless device to search for the wireless audio stream containing the audio content transmitted by the second wireless device at periodic intervals.

30. The non-transitory computer-readable storage medium recited in claim 25, the stored computer-executable instructions further configured to cause the first wireless device to:
receive the wireless audio stream containing the audio content transmitted by the second wireless device via the established wireless connection; and
play the audio content contained in the received wireless audio stream via a local speaker.

31. The non-transitory computer-readable storage medium recited in claim 30, wherein the audio content contained in the received wireless audio stream comprises at least one audio message that is repeated one or more times.

32. The non-transitory computer-readable storage medium recited in claim 31, the stored computer-executable instructions further configured to cause the first wireless device to:
receive, from the second wireless device, a transcript corresponding to the at least one audio message via the established wireless connection; and
display the received transcript on a local display.

* * * * *